March 22, 1949. J. S. CHEMEL 2,464,965
FILM MAGAZINE FOR MOTION-PICTURE PROJECTION
Filed April 16, 1948 5 Sheets-Sheet 1

INVENTOR.
JOSEPH S. CHEMEL
BY Fred Gerlach
ATTORNEY

March 22, 1949. J. S. CHEMEL 2,464,965
FILM MAGAZINE FOR MOTION-PICTURE PROJECTION
Filed April 16, 1948 5 Sheets-Sheet 3

INVENTOR.
JOSEPH S. CHEMEL
BY
Fred Gerlach
ATTORNEY

March 22, 1949.    J. S. CHEMEL    2,464,965
FILM MAGAZINE FOR MOTION-PICTURE PROJECTION
Filed April 16, 1948    5 Sheets-Sheet 4

INVENTOR.
JOSEPH S. CHEMEL
BY Fred Gerlach
ATTORNEY

March 22, 1949.                J. S. CHEMEL                2,464,965
FILM MAGAZINE FOR MOTION-PICTURE PROJECTION
Filed April 16, 1948                                5 Sheets-Sheet 5

INVENTOR.
JOSEPH S. CHEMEL
BY Fred Gerlach
ATTORNEY

Patented Mar. 22, 1949

2,464,965

UNITED STATES PATENT OFFICE 2,464,965

FILM MAGAZINE FOR MOTION-PICTURE PROJECTION

Joseph S. Chemel, Tulsa, Okla.

Application April 16, 1948, Serial No. 21,393

18 Claims. (Cl. 88—18.7)

The invention relates to motion picture projection.

One object of the invention is to provide a self-contained magazine containing an endless film which can be furnished and maintained for rental to users, and which renders unnecessary the handling of the film by users for loading and unloading, so that it is only necessary for the user to couple the magazine-unit to the projector-unit for exhibiting the pictures on the film, and the loading and re-loading of the magazine is performed by the institution which furnishes the films, and so that it is practically impossible for the user to abuse or make improper use of the rented films.

Another object of the invention is to provide a self-contained magazine-unit for an endless film which is demountable from the projection-unit, and includes film-feeding mechanism adapted to be coupled to, and uncoupled from, the driving mechanism of a projection-unit, such as exemplified in my application for Letters Patent filed May 27, 1946, Serial No. 672,469, of which the present application is in part a continuation.

Another object of the invention is to provide an improved self-contained magazine-unit for an endless film, comprising two side-by-side coils and by which the film will be fed from the inner convolution of one coil to the inner convolution of the other coil during the projection of the pictures on the film.

Another object of the invention is to provide a self-contained magazine-unit of film, which includes a foldable gate or section for the loop of the film which passes across the openings through which the light is projected during the projection of the subjects on the film.

Another object of the invention is to provide a self-contained magazine-unit for a film which is simple in construction and is adapted to be coupled to, and uncoupled from, the projection-unit.

Other objects of the invention will appear from the detailed description.

The invention consists in the several novel features which are hereinafter set forth and are more particularly defined by claims at the conclusion hereof.

In Figs. 3 to 13 the invention is exemplified in a self-contained magazine-unit which is demountable from the projection-unit, and for an endless film which includes a pair of coils arranged side-by-side and film-feeding devices detachable from, and adapted to be driven by, driving mechanism in the projection-unit. This magazine-unit is adapted to be coupled to, and uncoupled from, a projection-unit of the type exemplified in my aforesaid application Serial No. 672,469.

The demountable magazine-unit (Figs. 1 to 13) comprises a case or housing, generally designated 40, for an endless film, which includes a coil a, from which the film is fed to a loop in the projector-gate, and a coil of film $a'$, by which the film from the projector-gate is taken up. These coils are arranged side-by-side in the housing 40. This housing includes a hollow body-section 41 with an open side and a cover 42 which is detachably secured to the body-section 41 by a series of resilient clips 44 (Fig. 4), which are secured to a rim 45 integral with the body section 41, and are adapted to snap into perforated lugs 46 on the inner side of the cover. The housing is preferably formed of molded phenolic plastic material. The rim of the housing 40 is generally annular and the body section 41 and cover 42 are formed with angular extensions 49 for supporting a projecting gate and forming a pocket 50 into which the gate is foldable.

The inner convolutions of both coils $a$ and $a'$ of the film are rotatably and co-axially supported in the magazine housing or case by an annular series of rollers 48, which are journalled on studs 43 which are supported in the body-section 41 of the magazine case. A divider plate $b$ (Figs. 1 and 12) extends between the coils $a$ and $a'$ of the film, and a plate $b'$ (Fig. 13) fits against the outer side of the coil $a$ to hold the coils transversely on the guide rollers 48. Plates $b$ and $b'$ are spaced apart by flanges $b^2$. Plate $b'$ is provided with holes $b^3$ adapted to receive studs 43 on which said plate is removably secured by split rings 61 on the inner ends of studs 43. Upon removal of plate $b'$ the coils of film and the divider plate $b$ can be removed from the case when the cover section 42 is removed.

The projection gate, generally designated $f$, is provided for guiding a loop $a^3$ of the film for projection of the pictures thereon, and is supported between integral side extensions 49 of the body-section of the housing so it can be pivotally shifted from its operative position behind the projection lens into a recess or pocket 50 provided by extensions 49 when the magazine-unit is detached from the projection-unit. Gate $f$ comprises a rear wall 51, a front wall cover 52, and side walls 53, all of which are formed of sheet metal. Aligned openings 54 through which light passes for the projection of pictures on the film, are formed in walls 51 and 52. An arcuate member 55 of flexible metal, pivoted at 56 to the side wall 53 of the gate, forms a slidable closure for a slot 57 between the lower end of front wall or cover 52 of the gate and the end of said slot in the top of the body-section 41, and between extensions 49, while the gate is extended into position for projection of the pictures. The upper ends of rear wall 51 and cover 52 of the gate are curved or bulged outwardly to provide sufficient space for a loose loop $a^3$ of the film in the gate, from which the film is intermittently fed as hereinafter described. The cover 52 of the gate is removably secured between side walls 53 by a resilient clip 58 which engages a hook 59 on cover 52, and holds the curved end 60 of said cover seated on in-struck lugs 62 on side walls 53 and the inner end of arcuate member 55. This permits the front wall 52 to be removed from the gate for access to the film and the parts in the gate.

The sides 53 of the gate are provided with openings 70 and are journalled on the inner sides of the extensions 49 of housing 40 to permit the gate to swing on an axis which is coincident with the axis of the intermittent feed drum, hereinafter described, to maintain the loop $a^3$ in the gate when it is folded.

The endless film is fed from the outer convolution of coil $a$ to a portion of the loop $a^3$ at one side of the projection-gate by a continuously driven drum 82 with double sprockets thereon, with one of which the film is held engaged by an arcuate guide 84 which is stationarily secured in the housing 40. From guide 84 the film passes to one side of the projection-gate and is guided to form a loop $a^3$ in the gate, which is deflected at its upper end from one side of the gate to the other. The descending reach of the loop is fed step-by-step past the light openings 54 at said other side of the gate by an intermittent feed sprocket 74. From sprocket 74 the film is looped and guided to the second sprocket on drum 82. From drum 82 the film is fed to the outer convolution of the coil $a'$. From the inner convolution of coil $a'$ the film is fed to the inner convolution of the coil $a$. Driven rolls 63 are adapted to rotate both of the coils $a, a'$. A drum 64 with double sprockets is adapted to feed the film from coil $a'$ to a loose loop $a^4$ (Fig. 2), from which the film is fed to the inner convolution of coil $a$. From one of the rolls 63 the film passes to one of the sprockets on drum 64 and is held engaged with said sprocket by a guide 65. From guide 65 the loop $a^4$ (Fig. 5) passes to one of the rolls 63 to the second sprocket on drum 64, around which the film is directed by a guide 66. From guide 66 the film passes to another of the rolls 63 to form the inner convolution of coil $a$. From loop $a^4$ the film passes around left-hand roll 63, thence around sprocket 67, thence around right-hand roll 63 to the inner convolution of coil $a$, from which it passes around left-hand roll 63, sprocket 64, and around the right-hand roll 63 to the second inner convolution of said coil. This forms a predetermined loop in the innermost convolution of coil $a$, which insures rotation of coil $a$ and lessens any tendency of said coil to lag in rotation. A characteristic of this construction is that drums with sprockets or rolls for engaging the film in both coils and the portions extending between the gate and the coils, rotate in the same direction, so that a single rotary element feeds or drives two portions of the film.

Figure 5:
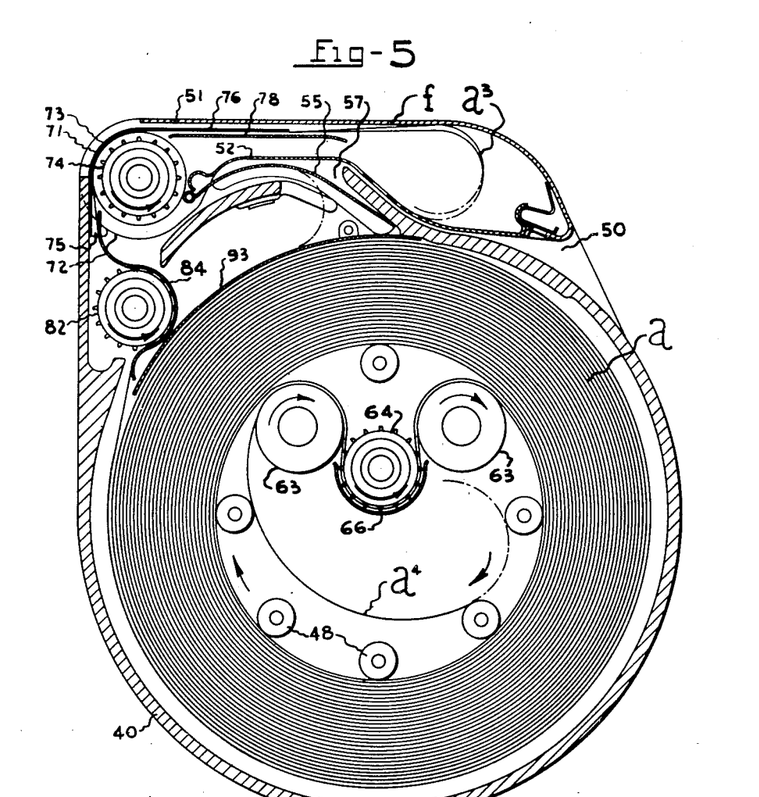
Fig. 5 is a section taken on line 5—5 of Fig. 1, the gate for the loop of film being folded for transportation or storage of the unit.
Figures 6, 7:
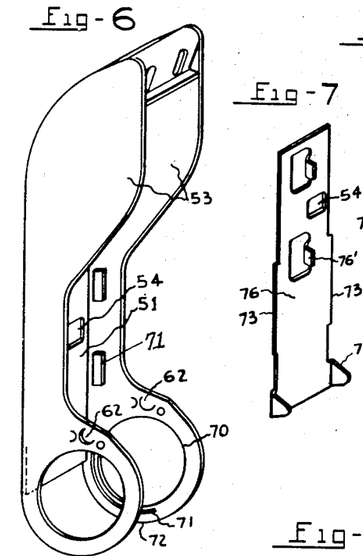
Fig. 6 is a perspective of the body of the foldable gate for the loop of film.
Figs. 7, 8, and 9 are perspective views of the film-guiding devices in a gate.
Figures 8, 9:
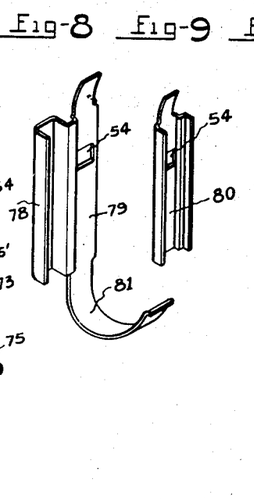
Figures 10, 11:
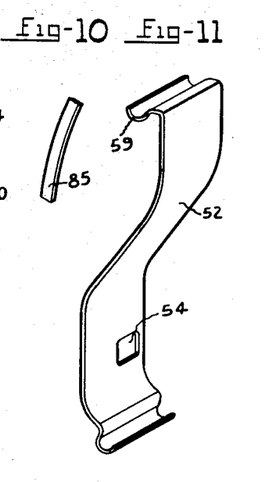
Fig. 10 is a perspective of the spring strip for guiding the edge of the film in the projection-gate.
Fig. 11 is a perspective of the removable cover of the gate.
Figures 12, 13:
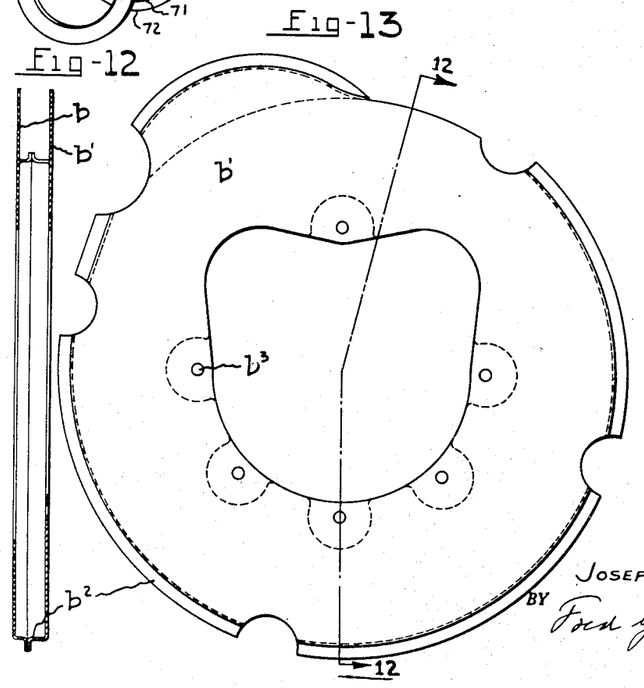
Fig. 12 is a section taken on line 12—12 of Fig. 13.
Fig. 13 is a side elevation of the holder for the coil from which the film is fed to the projector-gate.
Figures 14, 15, 16, 17, 18:
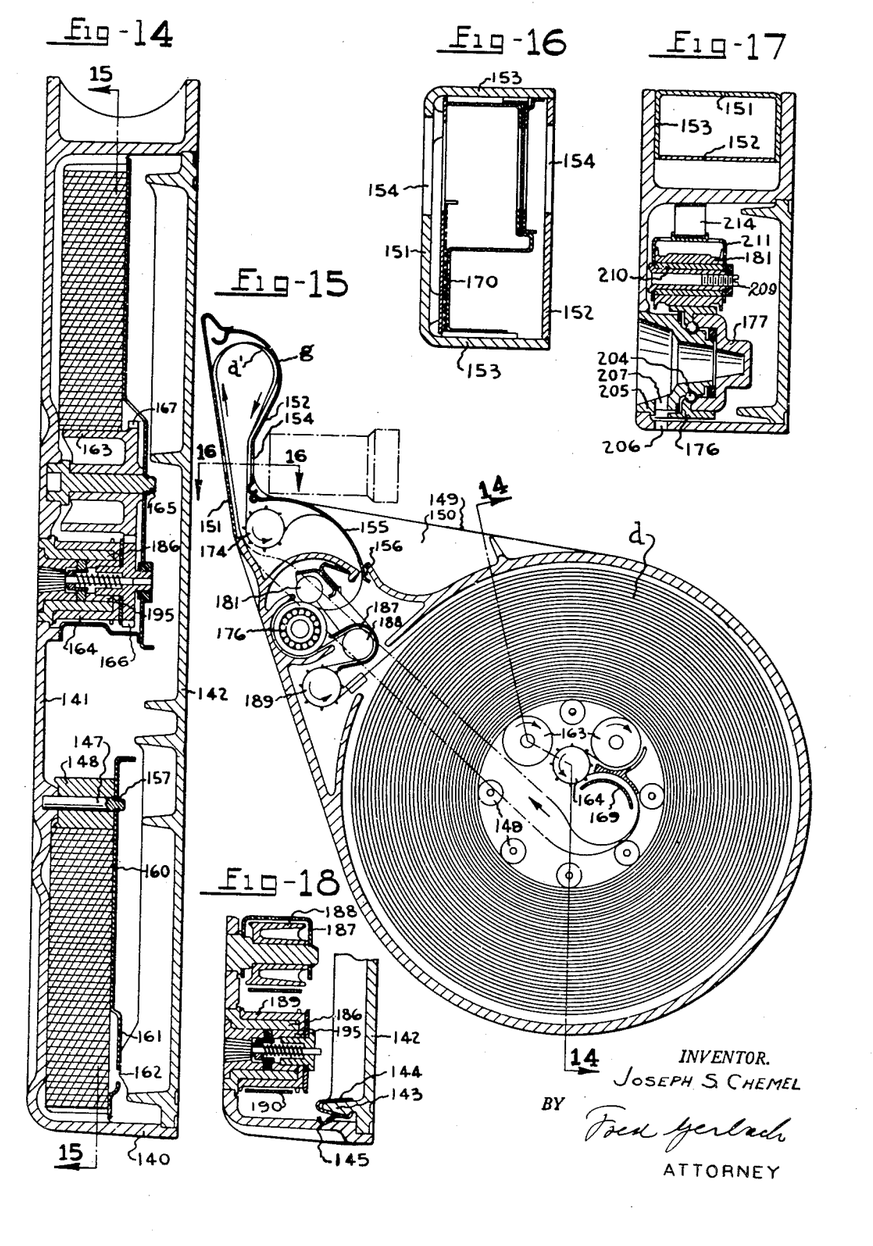
Fig. 14 is a section taken on line 14—14 of Fig. 15 of a modified form of the magazine for use with a single coil of endless film.
Fig. 15 is a section taken on line 15—15 of Fig. 14.
Fig. 16 is a section taken on line 16—16 of Fig. 15.
Fig. 17 is a section taken on line 17—17 of Fig. 19.
Fig. 18 is a section taken on line 18—18 of Fig. 19.
Figures 19, 20, 21, 22, 23:
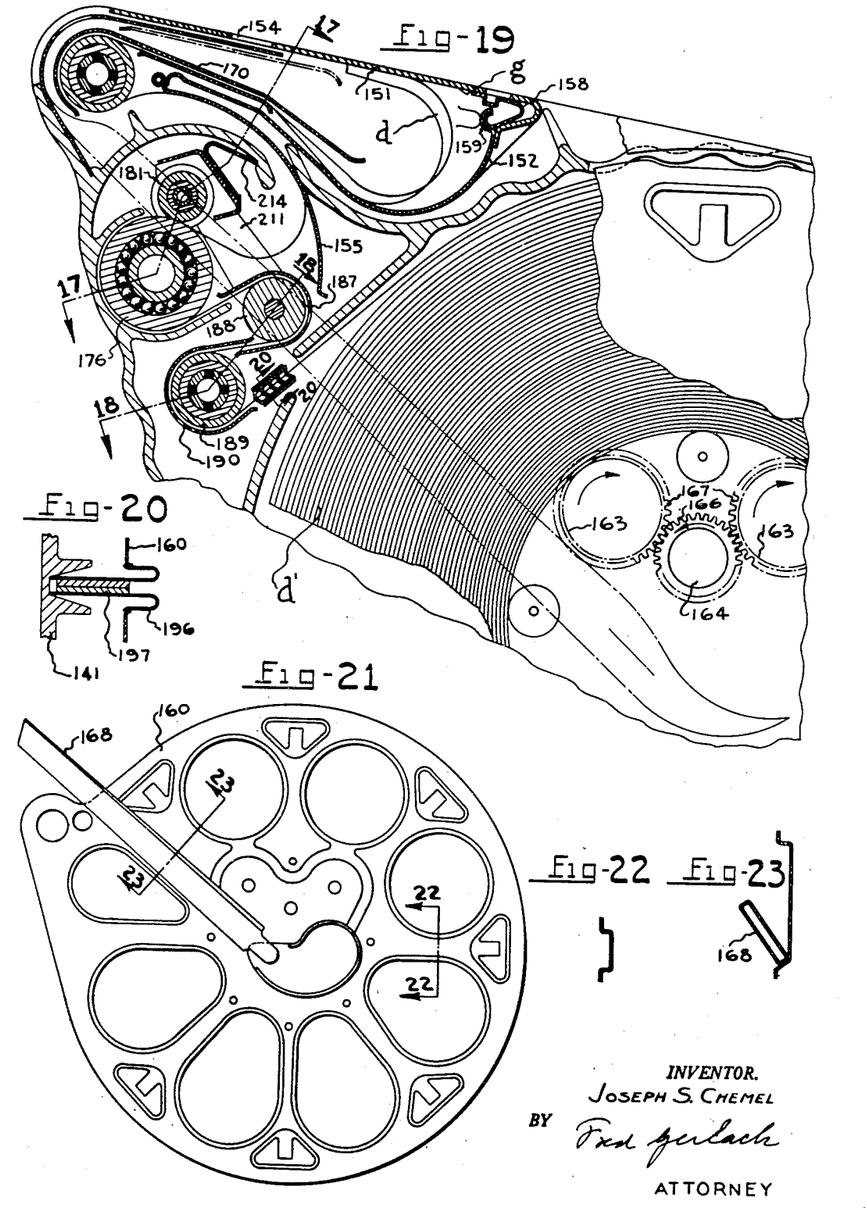
Fig. 19 is a section similar to Fig. 15 illustrating the gate folded into the housing of the magazine.
Fig. 20 is a section taken on line 20—20 of Fig. 19.
Fig. 21 is a side elevaton of the plate in the magazine-unit for holding one side of the film and the channel for guiding the film from the inner convolution of the coil to the projection-gate.
Fig. 22 is a section taken on line 22—22 of Fig. 21.
Fig. 23 is a section taken on line 23—23 of Fig. 21.

The film from the continuous drum 82 and guide 84 passes into the gate at one side of drum 74, and thence between a flexible guide plate 76 which has its lower end fixedly secured in the housing 40, and a co-acting surface 78 on a channelled portion of a guide 79. Tongues 76' on plate 76 guide the inner edge of the film passing between the plate 76 and surface 78. Lugs 75 on guide plate 76 engage the edges 72 of and position said plate in the gate $f$. Projecting edges 73 on plate 76 are retained by ribs 71 on the sides of the gate $f$ and cause said plate to bend as shown in Fig. 5 when the gate is folded into the housing. Above plate 76 and surface 78 the film is deflected in the upper enlarged portion of the gate to the opposite side of the gate. The descending reach of the film passes between a guide-member 79 and a pressure plate 80. A resilient strip 85 engages and guide one edge of the film passing between pressure plate 80 and guide member 79. Light openings 54 for projection of the pictures on the film are provided in cover 52, pressure plate 80, guide member 79, and plate 76.

The magazine-unit is adapted for operation by a projector-unit including continuous and intermittent driving mechanism, and to be detachably coupled to the projector-unit. Each of the drums 64, 74, and 82 is journalled on a bearing sleeve 89 which is fixed in the side of the body section 41 of the housing. A coupling sleeve 90 for each of said drums is journalled in each bearing sleeve 89 and has a splined bore for coupling it to a drive spindle on the projection-unit, and is secured to drive its associated drum. A series of radially movable brake shoes 91 are guided in each sleeve 90 and are normally forced outwardly by a conical plunger 92 for frictionally engaging the inner periphery of the bearing sleeve 89, and securing the drum against rotation while it is uncoupled from its driving spindle or unit. Each plunger 92 is spring-pressed and has a stem slidably guided in the hub of a coupling sleeve 90 for automatically shifting the plunger 92 to disengage the brake shoes from the bearing sleeve 89 when the drive spindle on the projection-unit is inserted into the coupling sleeve.

The rolls 63 are mounted on studs 63' which are secured in the wall 41 of the housing 40, and each of said rolls has an integral gear 67 which meshes with a gear 68 which is fixed to rotate with drum 64, for rotating the coils $a$ and $a'$.

The film fed from the intermittent feed sprocket 74 imparts impulses to the film in the loop $a^5$. The film passes from this loop between a flat spring 93 which is secured in the housing at 94, and a resilient strip 95 to damp the impulses in the loop $a^5$.

The film passes from springs 93, 95 to a platen 96 from which the film is guided to the drum 82. Spring plate 95 is provided with an aperture for a magnetic pickup block 97 which is supported by a resilient strip 98, and is adapted to contact a magnetic sound track on the film for reproducing sound from the film.

When the magazine-unit has been operatively coupled to a suitable projector-unit, the operation of the magazine will be as follows: Assuming the housing to be loaded with an endless film, including two coils side-by-side and threaded in the feed mechanism, as illustrated, the continuous driving drums 63 will rotate both coils $a$ and $a'$ of the film; the continuously driven drum 82 will simultaneously feed film from the coil $a$ to the gate $f$ at one side thereof to form the loop $a^3$; from said loop the film will be guided at the other side of the gate past the exposure openings 54 in the gate, to the intermittent sprocket drum 74, which will advance the film step-by-step across said opening; from sprocket 74 the film will form the loop $a^5$, and then pass between springs 93 and 94 to damp the impulses of the film in the loop; next, the film will pass across the magnetic pickup block 97 and to the continuous sprocket drum 82; from which it will be fed to, and wound on, the rotating coil $a'$; film from the inner convolution of the coil $a'$ will be fed by one of the sprockets on drum 64 to form the loop $a^4$, and fed by rolls 63 and the second sprocket on drum 64 to form the inner convolution of coil $a$.

Figures 1, 2, 3, 4:
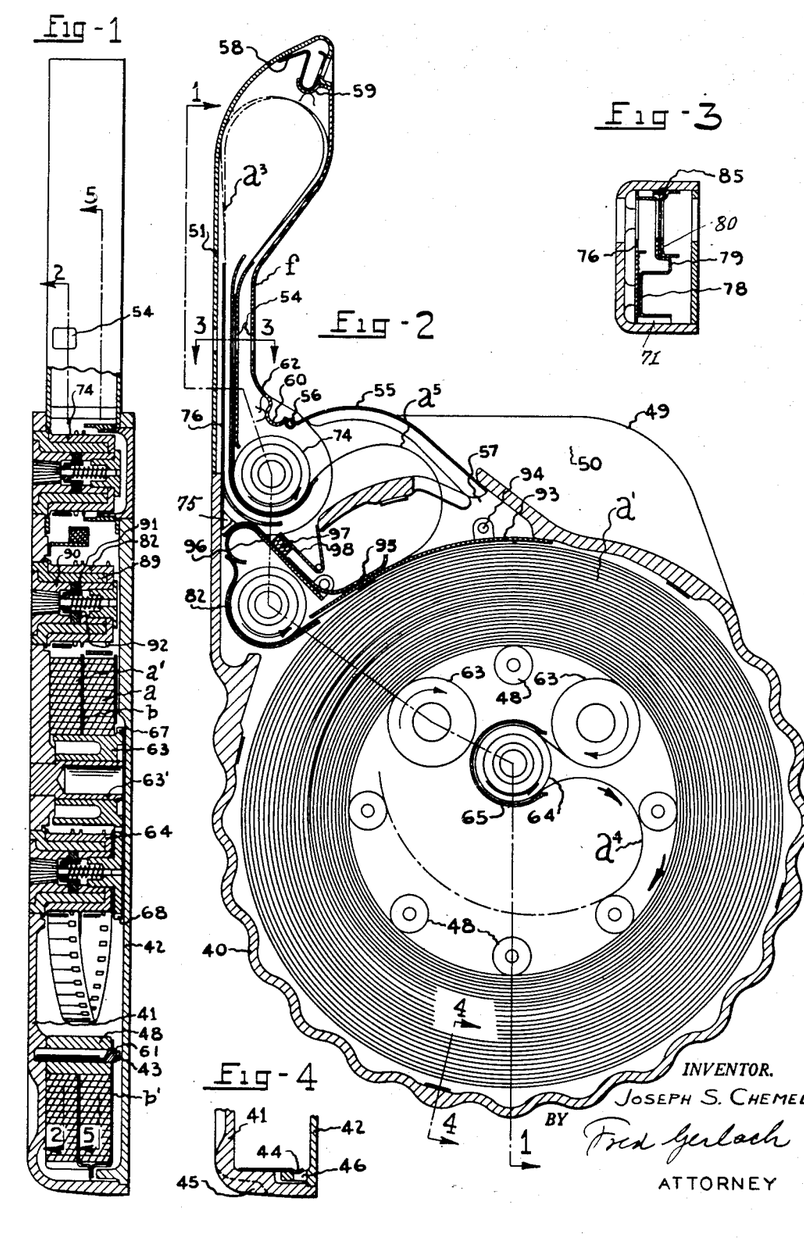
Fig. 1 is a transverse section, taken on line 1—1 of Fig. 2, of a magazine-unit embodying one form of the invention; the foldable gate for the loop of film being shown in its operative position.
Fig. 2 is a section taken on line 2—2 of Fig. 1.
Fig. 3 is a section taken on line 3—3 of Fig. 1.
Fig. 4 is a section taken on line 4—4 of Fig. 2.

When the magazine-unit is not in use, the gate $f$ is folded into the pocket 50, as illustrated in Fig. 5, without distributing the threading of the film in the magazine. During the folding of the gate, arcuate member 55 will slide in the magazine housing. Plate 76 is flexible and secured in the housing so that, when the gate is folded into pocket 50, said plate will close the opening 54 in the rear wall 51 of the gate $f$. When the gate is extended to its operative position, as illustrated in Fig. 2, arcuate member 55 will close the opening 57 in the housing, and the magazine will be operated when coupled to the projector-unit.

The magazine-unit thus described constitutes a self-contained structure with an endless film therein, and includes a housing for the entire film, a foldable projection-gate through which a loop of the film is fed, and continuous and intermittent sprocket drums for feeding the film through the projection-gate for optical reproduction. The film includes coils arranged side-by-side, and is retained threaded in the housing so that the unit is adapted to be supplied by a film agency ready for use on a projection-unit. The self-contained character of the magazine-unit avoids the necessity of handling the film by the user, and makes it possible for the film suppliers to do all the necessary handling and threading of the film with care. The unit is adapted to unwind the film from one coil, and to wind it onto the other coil, so that it is not necessary to re-wind the film, as must be done in conventional two-reel projection. The coils of film are directly supported by idler rolls which are carried by the housing, and are adapted to frictionally rotate the roll so that wear in the film projections is reduced. The construction is such that feed drums and rolls engage both coils of film and the reaches of the film between the coils and the loop of film in the gate.

In the form of the invention illustrated in Figs. 14 to 23, the magazine is adapted for an endless film $d$ with a single coil and includes mechanism by which it is unwound from the inner convolution of the coil, fed to a loop in the projection-gate, and rewound on the outer convolution of the coil. The film and feed mechanism are enclosed in a housing or case generally designated 140.

The housing includes a hollow body 141 with an open side and an integral cylindrical rim, and a cover 142. Cover 142 is provided with an integral inwardly projecting rib 143 (Fig. 18) and is detachably secured to the body 141 by a series of resilient clips 144 which are secured to a rib 143 and are provided with resilient tongues 145 which snap the recesses in the rim of the case. The housing sections are preferably formed of molded phenolic plastic material. These clips are adapted to secure the cover 142 and body-section 141 together so that it will be difficult for the lessee of the magazine to remove the cover. After the cover is snapped in place, it can be removed by applying vacuum thereto by the lessor. The housing is generally cylindrical and formed with angular extensions 149 for supporting the projection-gate and forming a pocket 150 into which the gate is foldable.

The coil of film $d$ is centrally supported in the magazine case by an annular series of rolls 148 which are journalled on studs 147 supported in the body section 141 of the magazine case, and said rolls engage the inner convolution of the coil for rotating it to take up the film.

A plate 160 of sheet metal fits inside of the rim of body-section 141 of the case 140 and positions the coil of film transversely in said case. Tongues 161 on plate 160 engage lugs 162 on cover-section 142, so that plate 160 will hold the coil of film close to the inner face of body-section 141. Plate 160 is removably held in said case by split rings 157 at the inner ends of studs 147 on which rollers 148 are journalled. Plate 160 also supports the guide 168 hereinafter described for directing the film from the center of the coil to the projection gate for the film.

The projection-gate, generally designated $g$, through which a loop of the film $d$ is fed for projection of the pictures thereon, is pivotally supported between integral side-portions of section 149 of the case so it can be pivotally shifted from its operative position behind the projection lens, into the recess or a pocket 150 in said section, when the magazine unit is detached from the projection unit. Gate g comprises a straight rear wall 151, a cover or front wall 152 and side-walls 153, all of which are formed of sheet metal. Aligned openings 154, through which light passes for projection of pictures on the film, are formed in walls 151, 152. An arcuate member 155, pivoted to the side-wall of the gate, forms a slidable closure between the lower end of the cover 152 of the gate and a slot 156 in the magazine case while the gate is extended into position for projection of the pictures. The upper portion of cover 152 is bulged outwardly to provide sufficient space for the loop $d'$ of film from which the film is fed to the intermittent feed drum hereinafter described. The cover 152 of the projection gate is removably secured between the side walls 153 by a spring clip 158 secured in the distal end of the projection gate and a hook 159 to permit the front wall to be removed for access to the film and parts in the gate. The inner end of cover 152 is resiliently seated on one end of arcuate closure member 155.

The endless film is fed and guided from the inner convolution of the coil to loop $d'$ in the projector-gate, and from said loop to the outer convolution of the coil. A pair of continuous drive drums or rolls 163 have outer peripheries which frictionally engage the inner convolution of the film, and are journalled on studs 165 which are supported in the wall 141 of the housing, and are adapted to rotate the coil of film. A continuous drive sprocket drum 164, to which the film passes from one of the rolls 163, feeds the film through an arcuate guide 169 which is formed by integral portions of housing section 141. From guide 169 the film passes into a flat guide-tube 168 which is secured on plate 160, and which directs the film in a quarter turn to loop $d'$ at one side of the gate g. Said loop is deflected from one side of the gate to the other side to cause the upwardly moving portion to clear, and the downwardly moving portion of the loop to travel across the projection openings 154. In the gate g the loop $d^3$ is guided by devices similar to those hereinbefore described in connection with the construction shown in Figs. 1 to 4. The downwardly extending branch of the loop $d'$ of the film passes to and around an intermittent drive sprocket drum 174. From drum 174 the film is looped and passes between a driven sound drum 176 and a spring-pressed guide roll 181. From drum 176 the film passes into a guide 187 and around an idler roll 188, from which the film passes to a continuous feed sprocket drum 189. From drum 189 the film passes to the outer convolution of the driven coil of film.

Between sprocket drum 189 and the coil film d in the housing, the film is wiped for removing foreign particles therefrom before it is re-wound on the coil. The means for wiping the film comprises (Figs. 19 and 20) a pair of resilient strips 196 mounted on plate 160 and wiper-pads 197 of suitable soft or elastic material, having diagonally extending wiping ribs, between which the film passes to the coil. This wipes the film as it is being re-wound.

The continuously driven sprocket drums 164 and the intermittently driven sprocket drum 174 are each adapted to be driven from the projector-unit by a detachable coupling device. Each of these drums is journalled on a sleeve 186, which is fixedly secured in the wall 141 of the housing. Each coupling device includes a coupling sleeve 195 which is secured to its associated drum and extends through the bearing sleeve 186, and is provided with a splined bore for detachably coupling it to a drive shaft on the projector-unit. Each sleeve 195 is provided with a brake device similar in construction to that described in the coupling sleeves for the sprocket drums in the construction illustrated in Figs. 1 to 5.

Rolls 163 are driven from sprocket drum 164 by means of a gear 166 which is fixed to rotate with said drum and gears 167 integrally formed with rolls 163, respectively, and gear 166 meshes with both of the gears 167.

The sound drum 176 (Fig. 17) is journalled on a ball bearing 204 which is carried by a bearing sleeve 205 which is fixed in the body section of the magazine housing. Drum 176 is fixed to a race 177 which is adapted to be frictionally engaged by a shaft in the projection-unit, as set forth in my application Serial No. 672,469. An orifice 206 is formed in the rim of the magazine case, and an axially aligned opening 207 is formed in sleeve 205 for the passage of a beam of light through the sound track of the film, as exemplified in my application serially numbered 672,469. Presser roll 181 is journalled on a tubular stud 210 which is mounted in a frame 211 which has side members pivotally supported on the shaft of idler roll 188. Frame 211 is engaged by a resilient or spring strip 214 which is confined in body section 141 of the housing 140 for pressing roll 181 against the film on the sound drum 176. Tubular stud 210 has a threaded bore and a screw-stud 209 engaging said bore is adapted to shift roll 181 for alignment with the sound drum 176.

When the magazine-unit exemplified in Figs. 14 to 23 has been operatively coupled to a suitable projector-unit, its operation will be as follows: Assuming the housing to be loaded with endless film, including a single coil, and threaded in the feed-mechanism and gate as illustrated, the continuous driving drums 163 will rotate the coil of film; sprocket drum 164 will feed the film through guide 169 and tube 168, to one side of the gate g to form the loop $d'$; said loop will be guided to the other side of the gate past the exposure openings 154; the intermittent sprocket drum 174 will advance the film step-by-step across said opening; from drum 174 the film will form a loop and be guided by cover 155 to the pressure roll 181 and sound drum 176; from the sound drum the film will pass around idler roll 188 to continuous feed sprocket 189; and the film will be passed between the wipers 197 to the outer convolution of the rotating roll of film.

The magazine-unit thus described constitutes a self-contained structure with a coil of endless film therein, and includes a housing for the film, a foldable projection-gate through which the loop of the film is threaded, and continuous and intermittent sprocket drums for feeding the film through the projection-gate for optical reproduction. This unit also avoids the necessity of handling the film by the user, and makes it possible for the film suppliers to do all the necessary handling and threading of the film with care.

The invention is not to be understood as restricted to the details set forth, since these may be modified within the scope of the appended claims without departing from the spirit and scope of the invention.

Having thus described my invention, what I claim as new and desire to secure by Letters Patent is:

1. A magazine-unit for detachable connection with a projector-unit for motion pictures, comprising: a housing for a coil of film, a section for exposing the film for optical projection, foldably connected to the housing, means in the section for guiding the film in a loop, said section being foldable into position for said projection, and into a position for close relation with the housing, film-feed devices in the housing including an intermittent device for feeding the loop of film and continuous devices for feeding the film to and from the coil, and means for detachable connection of the feed devices with driving mechanism on the projector-unit.

2. A magazine-unit for detachable connection with a projector-unit for motion pictures, comprising: a housing for a coil of film, provided with an exterior pocket, a section for exposing the film for optical projection, foldably connected to the housing, means in the section for guiding the film in a loop, said section being foldable into position for said projection and into said pocket, film-feed devices in the housing including an intermittent device for feeding the loop of film through said section and continuous devices for feeding the film to the loop and from the intermittent device, and means for detachable connection of the feed devices with the driving mechanism on the projector-unit.

3. A magazine-unit for detachable connection with a projector-unit for motion pictures, comprising: a housing for a coil of film, a gate for exposing the film for optical projection, pivotally connected to the housing, means in the gate for guiding the film in a loop, said gate being foldable into position for optical projection and into a position in close relation with the housing, film-feed devices in the housing including an intermittent device for feeding the loop of film through the gate and continuous devices for feeding the film to and from the coil, and means for detachable connection of the said devices with driving mechanism on the projector-unit.

4. A magazine-unit for detachable connection with a projector-unit for motion pictures, comprising: a housing for an endless film and including a section for exposing the film for optical projection, foldably connected to the housing, means in the section for guiding the film in a loop, said section being foldable into position for said projection, and into a position for close relation with the housing, and film-feed devices in the housing including an intermittent device for feeding the loop of film through said section and continuous devices for feeding the film to and from the coil, and provided with means for detachable connection with driving mechanism on the projector-unit.

5. A magazine-unit for detachable connection with a projector-unit for motion pictures, comprising: a housing for an endless film including a coil, provided with an exterior pocket, a section for exposing the film for optical projection foldably connected to the housing, means in the section for guiding the film in a loop, said section being foldable into position for said projection and into said pocket, and film-feed devices in the housing including an intermittent device for feeding the loop of film through said section and continuous feed devices, and means for detachable connection with the driving mechanism on the projector-unit.

6. A magazine-unit for detachable connection with a projector-unit for motion pictures, comprising: a housing for a coil of endless film, a gate for exposing the film for optical projection pivotally connected to the housing, means in the gate for guiding the film in a loop, said gate being foldable into position for optical projection and into a position in close relation with the housing, film-feed devices in the housing, including an intermittent device for feeding the loop of film through the gate, continuous devices for feeding the film to and from the coil, and means for detachable connection with driving mechanism on the projector-unit.

7. A magazine-unit for detachable connection with a projector-unit for motion pictures, comprising: a housing for an endless film including a coil, a section for exposing the film for optical projection, foldably connected to the housing, means in the section for guiding the film in a loop, said section being foldable into position for said projection, and into a position for close relation with the housing, film-feed devices in the housing including an intermittent device for feeding the loop of film through said section and continuous devices for feeding the film from the coil to the loop and from the intermittent device to the coil, and means for detachable connection with driving mechanism on the projector-unit.

8. A magazine-unit for detachable connection with a projector-unit for motion pictures, comprising: a housing for an endless film including a coil, provided with an exterior pocket, a section for exposing the film for optical projection, foldably connected to the housing, means in the section for guiding the film to a loop, said section being foldable into position for said projection and into said pocket, and feed devices in the housing including continuous devices for feeding the film from and to the coil for feeding the loop of film through said section, and provided with means for detachable connection with the driving mechanism on the projector-unit.

9. A magazine-unit for detachable connection with a projector-unit for motion pictures, comprising: a housing for a film including a pair of coils, a gate for exposing the film for optical projection pivotally connected to the housing, means in the gate for guiding the film in a loop, said gate being foldable into position for optical projection and into a position in close relation with the housing, film-feed devices in the housing including an intermittent device for feeding the loop of film through the gate and continuous devices for feeding the film to the coils, and means for detachable connection of said devices with driving mechanism on the projector-unit.

10. A magazine-unit for detachable connection with a projector-unit for motion pictures, comprising: a housing for a plurality of film, a section for exposing the film for optical projection, foldably connected in the housing, means in the section for guiding the film in a loop, said section being foldable into position for said projection, and into a position for close relation with the housing, film-feed devices in the housing including an intermittent device for feeding the film in the loop in said section and continuous devices for feeding the film between one coil and the loop and from the intermittent device to the other coil, and means for detachable connection with driving mechanism on the projector-unit.

11. A magazine-unit for detachable connection with a projector-unit for motion pictures, comprising: a housing for a film including a plurality of coils, provided with an exterior pocket, a section for exposing the film for optical projection, foldably connected to the housing, means in the section for guiding the film in a loop, said section being foldable into position for said projection and into said pocket, film-feed devices in the housing including an intermittent device for feeding the loop of film through said section and continuous devices for feeding the film from one coil to another coil, and means for detachable connection of said devices with the driving mechanism on the projector-unit.

12. A magazine-unit for detachable connection with a projector-unit for motion pictures, comprising: a housing for a coil of film provided with an exterior pocket, a gate for exposing the film for optical projection foldably connected to the housing, means in the gate for guiding the film in a loop, said gate being foldable into position for said projection and into said pocket, film-feed devices in the housing, including an intermittent device, for feeding the loop of film through said section and continuous devices for feeding the film to and from the coil, and means for detachable connection of said devices with the driving mechanism on the projector-unit.

13. A magazine-unit for detachable connection with a projector-unit for motion pictures, comprising: a housing for an endless film including a plurality of coils, a section for exposing the film for optical projection, foldably connected to the housing, means in the section for guiding the film in a loop, said section being foldable into position for said projection, and into a position for close relation with the housing, film feed devices in the housing including an intermittent device for feeding the film in the loop through the section and continuous devices for feeding the film from one coil to the loop and from the intermittent device to another coil and from one coil to another, and means for detachable connection with driving mechanism on the projector-unit.

14. A magazine-unit for detachable connection with a projector-unit for motion pictures, comprising: a housing for an endless film including a pair of coils, provided with an exterior pocket, a section for exposing the film for optical projection foldably connected to the housing, means in the section for guiding the film in a loop, said section being foldable into position for said projection and into said pocket, film-feed devices in the housing, including an intermittent device for feeding the loop of film through said section, and continuous devices for feeding the film from one coil to the loop, for feeding the film to another coil, and for feeding the film from one coil to another, and means for detachable connection with the driving mechanism on the projector-unit.

15. A magazine-unit for detachable connection with a projector-unit for motion pictures, comprising: a housing for a coil of film, a gate for exposing the film for optical projection, pivotally connected to the housing, means in the gate for guiding the film in a loop, said gate being foldable into position for optical projection and into a position in close relation with the housing, driven film feed devices including an intermittent drum for feeding the loop of film through the gate, and means for detachable connection of the feed devices with driving mechanism on the projector-unit, said gate being pivoted to swing on the axis of said drum into position for optical projection and into the pocket.

16. A magazine-unit for detachable connection with a projector-unit for motion pictures, comprising: a housing for a coil of film, a gate for exposing the film for optical projection pivotally connected to the housing, means in the gate for guiding the film in a loop, said gate being foldable into position for optical projection and into a position in close relation with the housing, film feed devices in the housing including an intermittent drum for feeding the loop of film through the gate and continuous devices for feeding the film to and from the coil, and means for detachable connection of said devices with driving mechanism on the projector-unit, the gate including a member slidable into the housing.

17. A magazine-unit for detachable connection with a projector-unit for motion pictures, comprising: a housing for a coil of film, a gate for exposing the film for optical projection pivotally connected to the housing, means in the gate for guiding the film in a loop, said gate being foldable into position for optical projection and into a position in close relation with the housing, film feed devices in the housing including an intermittent drum for feeding the loop of film through the gate and continuous devices for feeding the film to and from the coil, and means for detachable connection of said devices with driving mechanism on the projector-unit, the gate having a member pivoted thereto, slidable into the housing and extending over the drum.

18. A magazine-unit for detachable connection with a projector-unit for motion pictures, comprising: a housing for a coil of film, and including a section for exposing the film for optical projection, means in the section for guiding the film in a loop, means in said housing for the reproduction of sound from a sound track on the film, said section being foldable into position for said projection, and into a position for close relation with the housing, film-feed devices in the housing including an intermittent device for feeding the loop of film through said section and continuous devices for feeding the film to and from the coil, and means for detachable connection of said devices with driving mechanism on the projector-unit.

JOSEPH S. CHEMEL.

REFERENCES CITED

The following references are of record in the file of this patent:

UNITED STATES PATENTS

| Number | Name | Date |
|---|---|---|
| 1,839,132 | Thornton | Dec. 29, 1931 |
| 2,008,033 | Nystrom | July 16, 1935 |
| 2,059,834 | Wittel | Nov. 3, 1936 |

FOREIGN PATENTS

| Number | Country | Date |
|---|---|---|
| 746,448 | France | Mar. 7, 1933 |